US011794923B2

(12) United States Patent
Bodkhe et al.

(10) Patent No.: US 11,794,923 B2
(45) Date of Patent: Oct. 24, 2023

(54) AIRCRAFT REFUELING SYSTEM

(71) Applicant: Eaton Intelligent Power Limited, Dublin (IE)

(72) Inventors: Abhijit A. Bodkhe, Pune (IN); Ashok K. Vishwakarma, Maharashtra (IN); Jaspal Rawat, Irvine, CA (US); Steven Hum, Eden Prairie, MN (US); Parag More, Kothrud Pune (IN); Chandrashekhar S. Nehete, Pune (IN); Robert L. Sbonek, Garden Grove, CA (US); Jeffrey M. Laing, Costa Mesa, CA (US); Taruna Khandelwal, Pune (IN); Vivek Agarwal, Pune (IN)

(73) Assignee: Eaton Intelligent Power Limited, Dublin (IE)

(*) Notice: Subject to any disclaimer, the term of this patent is extended or adjusted under 35 U.S.C. 154(b) by 257 days.

(21) Appl. No.: 17/276,559

(22) PCT Filed: Sep. 20, 2019

(86) PCT No.: PCT/EP2019/025312
§ 371 (c)(1),
(2) Date: Mar. 16, 2021

(87) PCT Pub. No.: WO2020/057781
PCT Pub. Date: Mar. 26, 2020

(65) Prior Publication Data
US 2022/0048644 A1 Feb. 17, 2022

Related U.S. Application Data

(60) Provisional application No. 62/734,307, filed on Sep. 21, 2018.

(51) Int. Cl.
B64F 1/28 (2006.01)
B64D 37/16 (2006.01)
(Continued)

(52) U.S. Cl.
CPC ............... *B64F 1/28* (2013.01); *B64D 37/16* (2013.01); *G05B 19/052* (2013.01); *G05B 23/0232* (2013.01); *B67D 7/0401* (2013.01)

(58) Field of Classification Search
None
See application file for complete search history.

(56) References Cited

U.S. PATENT DOCUMENTS 8,381,779 B1    2/2013  Wyler
9,327,600 B1 *  5/2016  Nehmeh .................. B60L 1/00
(Continued)

FOREIGN PATENT DOCUMENTS

WO    12/031957 A1    3/2012
WO    12/170672 A1    12/2012

OTHER PUBLICATIONS

International Search Report, PCT/EP2019/025312, dated Jan. 7, 2020.

*Primary Examiner* — Bernard G Lindsay
(74) *Attorney, Agent, or Firm* — Merchant & Gould P.C.

(57) ABSTRACT

An aircraft refueling system (10) includes a master controller (12), a fleet controller (14) in communication with the master controller, a platform controller (18) in communication with the fleet controller, and a fuel control system (16) in communication with the platform controller. Embodiments of an aircraft refueling system may include a primary pressure controller (20), a secondary pressure controller (22), a programmable logic controller (24), and a data logger controller (26). The master controller may be configured to receive and analyze data from at least one of the fleet controller, the platform controller, and the fuel control system; and to modify operational parameters or upgrade the fuel control system based at least in part on the analysis of received data.

20 Claims, 3 Drawing Sheets

(51) Int. Cl.
*G05B 19/05* (2006.01)
*G05B 23/02* (2006.01)
*B67D 7/04* (2010.01)

(56) References Cited

U.S. PATENT DOCUMENTS

| | | | |
|---|---|---|---|
| 10,614,392 B1* | 4/2020 | Mottram | G06F 3/0481 |
| 2003/0093187 A1* | 5/2003 | Walker | B64D 45/0059 |
| | | | 701/1 |
| 2005/0189036 A1 | 9/2005 | Bryan et al. | |
| 2006/0237591 A1* | 10/2006 | McCoskey | B64C 25/42 |
| | | | 244/135 R |
| 2012/0173072 A1* | 7/2012 | Portocalis | G06Q 10/06 |
| | | | 701/29.3 |
| 2013/0007650 A1* | 1/2013 | Van Hoy | B64F 1/28 |
| | | | 715/771 |
| 2018/0127109 A1 | 5/2018 | Freeth et al. | |
| 2018/0135772 A1* | 5/2018 | Gundlach | H02K 7/1166 |
| 2018/0364120 A1* | 12/2018 | Ribarov | G01L 9/0025 |

\* cited by examiner

AIRCRAFT REFUELING SYSTEM

CROSS-REFERENCE TO RELATED APPLICATIONS

This application is a National Stage Patent Application of International Patent Application No. PCT/EP2019/025312, filed Sep. 20, 2019, which claims the benefit to U.S. Provisional Patent Application No. 62/734,307, filed on Sep. 21, 2018, the contents of which are herein incorporated by reference in their entireties.

TECHNICAL FIELD

The present disclosure generally relates to fluid systems, including refueling systems that may be used in connection with aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

With some refueling systems, there may not be an efficient way to provide modifications and upgrades to controllers.

Some refueling systems may be standalone devices that may not be configured for receiving data, transmitting data to remote locations, or analyzing data from a plurality of systems to improve system performance.

There is a desire for solutions/options that minimize or eliminate one or more challenges or shortcomings of aircraft refueling systems. The foregoing discussion is intended only to illustrate examples of the present field and should not be taken as a disavowal of scope.

SUMMARY

In embodiments, an aircraft refueling system may include a master controller, a fleet controller in communication with the master controller, a platform controller in communication with the fleet controller, and/or a fuel control system in communication with the platform controller. The fuel control system may include a primary pressure controller, a secondary pressure controller, a programmable logic controller, and/or a data logger controller. The master controller may be configured to receive and analyze data from at least one of the fleet controller, the platform controller, and the fuel control system. The master controller may be configured to modify operational parameters and/or upgrade (e.g., remotely upgrade) the fuel control system according to said analysis of the received data.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
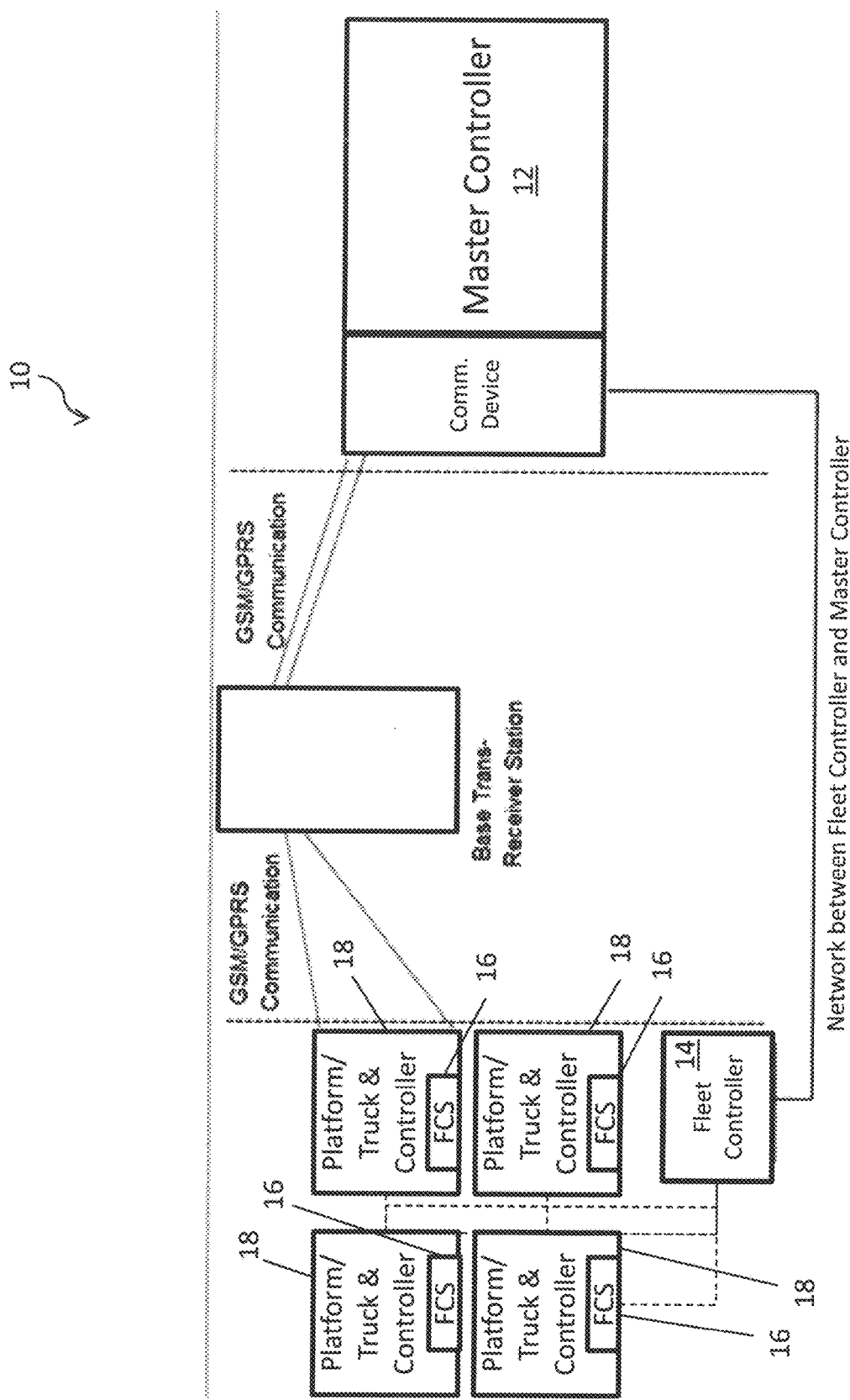
FIG. 1 is a schematic view generally illustrating an embodiment of an aircraft refueling system according to teachings of the present disclosure.

In embodiments, such as generally illustrated in FIG. 1, an aircraft refueling system 10 may include a master controller 12, one or more airport/fleet controllers 14, one or more refueling platforms (e.g., a truck, a hydrant, etc.), and/or one or more fuel control systems (FCS) 16. The master controller 12, the airport/fleet controller(s) 14, a platform controller 18 connected to the platform, and/or the FCS 16 may work in conjunction to control refueling of an aircraft (e.g., ground refueling at an airport). The master controller 12, the airport/fleet controller 14, the platform controller 18, and/or the FCS 16 may communicate with each other directly or indirectly, such as via wired and/or wireless communication, such as GSM (Global System for Mobile Communications), GPRS (General Packet Radio Service), WiFi, Bluetooth, Ethernet, CAN (controller area network), and/or others.

Figure 2:
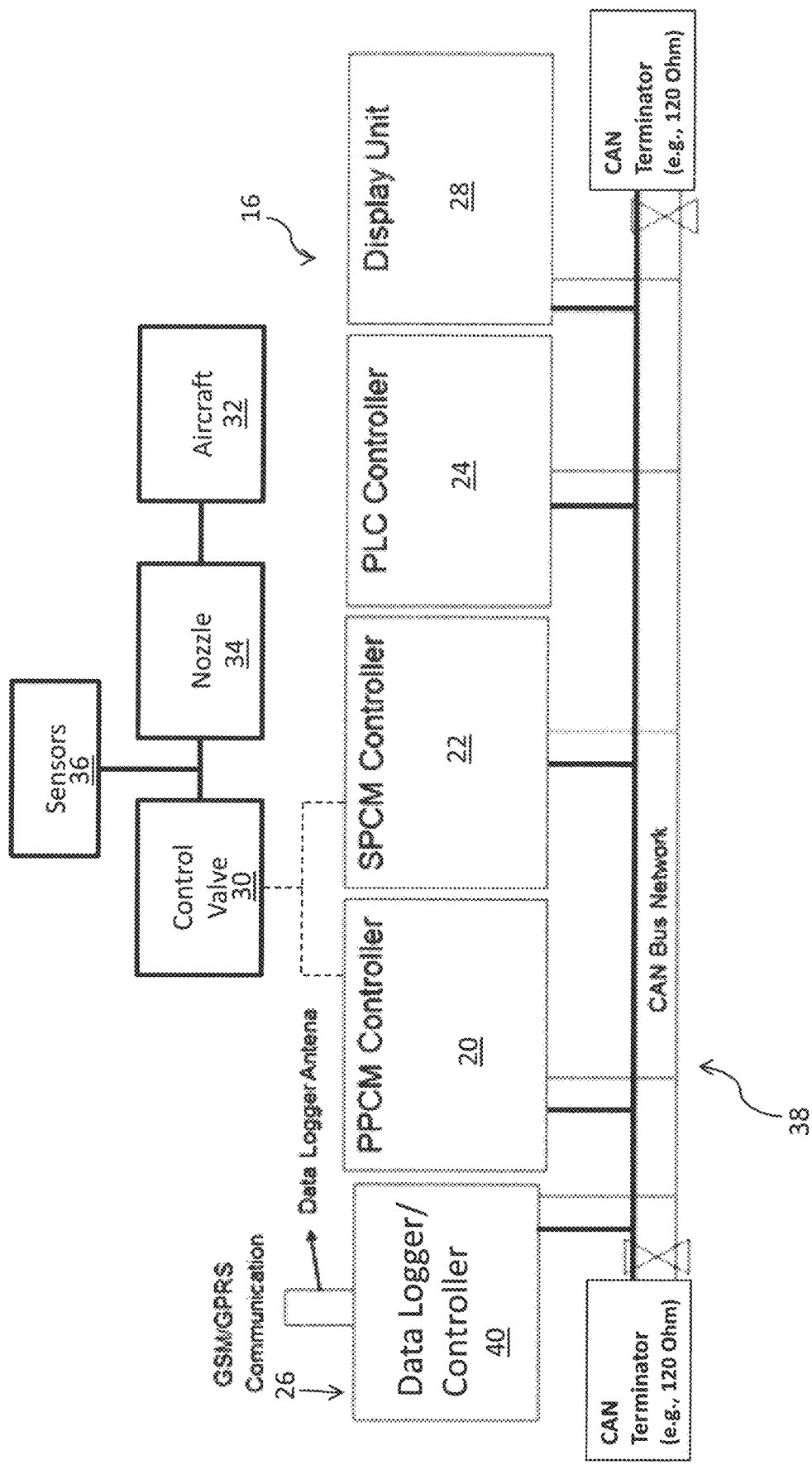
FIG. 2 is a schematic view generally illustrating an embodiment of a fuel control system according to teachings of the present disclosure.
Figure 3:
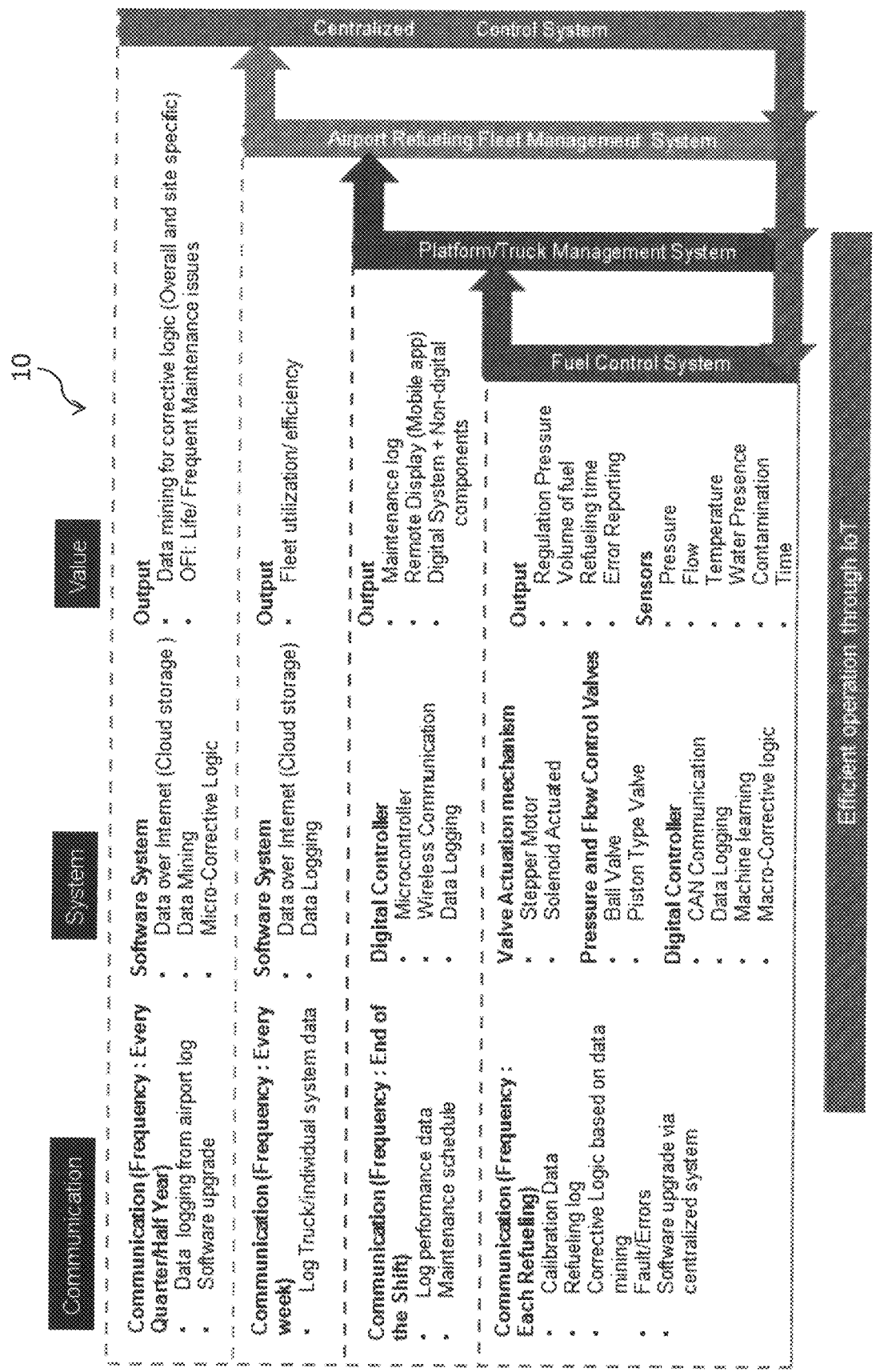
FIG. 3 is a graphical view generally conveying portions of an embodiment of an aircraft refueling system according to teachings of the present disclosure.

With embodiments, such as generally illustrated in FIG. 2, the FCS 16 may be configured to control (e.g., directly) fuel flow to an aircraft 32. An exemplary FCS 16 may include, for example and without limitation, the Digital IV system available from Eaton Corporation. The FCS 16 may include a primary pressure control module (PPCM) controller 20, a secondary pressure control module (SPCM) controller 22, a programmable logic controller (PLC) 24, a data logger unit 26, and/or a display unit 28. For example and without limitation, the PPCM controller 20 and/or the SPCM controller 22 may control a fuel control valve 30. When open, the fuel control valve 30 may provide fuel to the aircraft 32, such as via a nozzle 34. The PPCM controller 20 and/or the SPCM controller 22 may be configured to control the fuel control valve 30 according to a fluid pressure at or about the nozzle 34. One or more sensors 36 (e.g., a flow meter, a pressure sensor, a temperature sensor, a water presence sensor, a contamination sensor, a timer/clock, etc.) may be provided and/or may be connected at or about a nozzle 34.

In embodiments, one or more of the PPCM controller 20, the SPCM controller 22, the PLC 24, the data logger unit 26, and the display unit 28 may communicate with each other, such as, for example and without limitation, via a CAN bus protocol 38.

In embodiments, the data logger unit 26 may include a data logger controller 40. The data logger controller 40 may, inter alia:

(1) operate with power from a vehicle battery and/or a vehicle electrical system (e.g., 9-48 VDC);
(2) have operating and storage temperature compatibilities per vehicle standards;
(3) be compact in design and of a standard size;
(4) have an operating system compatible with expected use;
(5) have an electronic processor compatible with expected use;

(6) have a memory, such as dynamic random access memory (DRAM), which may store bits of data;
(7) be configured for storage expansion;
(8) have a real time clock with battery backup and appropriate mean time between failure (MTBF);
(9) have a status indicator (e.g., light emitting diodes or LEDs) and reset button functionality;
(10) have communication interfaces, such as CAN bus, GSM/GPRS, LAN networking, compatible with an expected use;
(11) have a debug port;
(12) have a compact antenna;
(13) be certified per vehicle standards;
(14) have appropriate mounting features;
(15) have minimal accessories; and/or
(16) have electronic security features to prevent unauthorized access to data logger controller programming and configuration, local hardware, the transmission of the data, and/or the storage and analysis of the data.

In embodiments, the data logger controller 40 may act as an interface between a master computer, which may include a dedicated server, and the respective FCS 16. A communication interface between the data logger controller and the master controller may include a CAN bus, GSM, GPRS, and/or any applicable communication network. With embodiments, data and communication loss may be minimized and/or prevented, at least during critical operation of the FCS 16. The FCS may be installed on a platform (e.g., a refueling truck) and may include one or more unique node identifiers. For example and without limitation, the PLC 24, the PPCM controller 20, the SPCM controller 22 and/or the display unit 28 may each include unique node identifiers. The master controller 12 may be configured to access the FCS 16 and components thereof according to such unique node identifiers.

In embodiments, a smart protocol may be utilized to communicate with the FCS 16. A smart protocol may dictate what action should be taken at what time. For example and without limitation, the frequency of data logging and communicating logged data to the master controller 12 may be determined according to certain specifications or requirements, (e.g., end user specifications, regulations, standards, etc.).

With each refueling event, the FCS 16 may log data and communicate a refueling log, any faults detected, and/or any corrective action taken to a platform controller, such as, for example and without limitation, via a wired and/or wireless CAN network. Such a system may, among other things, provide for better control of refueling pressure, more accurate determination of the volume of fuel dispensed, reduced fueling times, and/or better or more efficient error reporting. One or more of the PPCM controller 20, the SPCM controller 22, the PLC 24, the data logger controller 40, the platform controller 18, the fleet controller 14, and the master controller 12 may include macro level corrective logic that may, for example and without limitation, incorporate machine learning to analyze/study current fueling performance (e.g., control valve performance) and adjust control parameters to achieve improved and/or optimum system performance. Relative to other systems, embodiments of an aircraft refueling system 10 and/or an FCS 16 may provide greater control over prognostic and diagnostic capabilities. The FCS 16 may include full system built-in-test (BIT) functionality that may be configured to ensure proper functioning of the FCS 16 without requiring periodic maintenance or the downtime that may associated therewith. One or more of the PPCM controller 20, the SPCM controller 22, the PLC 24, the data logger controller 40, the platform controller 18, the fleet controller 14, and the master controller 12 may be configured to monitor trends in changes in operational performance that may indicate time-dependent wear for one or more components of the FCS 16.

In embodiments, a platform controller 18 may be configured to communicate with the FCS 16, the fleet controller 14, the master controller 12, and/or other controllers. The platform controller 18 may be configured to log maintenance schedules and overhaul or fault details identified for components that may not be part of a digital system. The platform controller 18 may be configured to uniquely tag or identify information/logged data for further analysis (e.g., via the fleet controller 14 and/or the master controller 12). With embodiments, the platform controller 18 may include wireless communication functionality and may communicate information from other components that may have limited or no wireless communication functionality, such as sensors and/or controllers, which may facilitate communication via a single wireless channel. Information communicated by the platform controller 18 may be relayed to a handheld device (e.g., via a web interface, via an application or app, etc.) that may facilitate monitoring by an operator.

With embodiments, the fleet controller 14 may log data from a plurality of platform controllers 18, such as periodically (e.g., weekly). Data captured from platform controllers 18 may be uploaded to the master controller 12, such as via the internet. Consolidated data gathered from a plurality of platform controllers 18 may be used in analyzing fleet utilization, such as for an airport refueling operator. Efficiency of refueling operations may be improved as critical data for each platform, such as the number of refueling events, volume of fuel handled, maintenance logs, and/or failure frequency, may be recorded.

In embodiments, a master controller 12 may be configured to store some or all information that may be received from the FCS(s) 16, platform controllers 18, and/or fleet controllers 14. The master controller 12 may be configured to utilize data mining to analyze available data to update monitored data values and/or current software of controllers (e.g., the fleet controller(s) 14, the platform controller(s) 18, the PPCM controller 20, the SPCM controller 22, the PLC 24, and/or the data logger controller 40). The master controller 12 may be configured to analyze location-based issues or performance as digital and non-digital system-related data may be captured. Reliability numbers may be established and opportunities for improvement can be addressed. Based on trends/data from one location (e.g., one airport, one platform, etc.), the master controller 12 may predict impending or anticipated failure at a second location (e.g., a different FCS 16 connected to a different platform at a different airport with a different fleet controller 14) if the same or a similar trend is observed. The master controller 12 may be configured to simulate an overall impact, at a micro level, of software changes. For example and without limitation, a master controller may include models of one or more FCS(s), platform controller(s) 18, and/or fleet controller(s) 14. The master controller 12 may be configured to deploy software updates to some or all existing systems, such as fleet controller(s) 14, platform controller(s) 18, and/or FCS(s) 16. For example and without limitation, software upgrades may be communicated to each fleet controller 14 over the internet and the software may be loaded on to each platform controller 18 and/or FCS 16 via the respective fleet controller(s) 14.

With embodiments, the aircraft refueling system 10 may be configured for smart remote programming of controllers and data logging used in connection with refueling platforms. For example and without limitation, an aircraft refueling system may, inter alia:

(1) continuously log refueling data from platforms (e.g., fuel trucks);
(2) log and store data sent remotely to the master controller 12;
(3) perform and/or receive field data analysis, such as via data or analysis input by a user (e.g., an operator or engineer);
(4) upgrade the software of controllers as and when desired, such as controllers of or connected to FCS(s) 16 and/or displays; and/or
(5) monitor data from a platform (e.g., fuel truck) after a software upgrade.

With embodiments, the aircraft refueling system 10 may include one or more operating modes, such as a general operating mode, a data capturing mode, a data analysis mode, a programming mode, and/or a smart mode.

In embodiments, in a general operating mode, the data logger controller 40 may log data and may store the data in local storage and/or in a storage expansion device/card.

With embodiments, in a data capturing mode, the data logger controller 40 may fetch/transmit the logged data to a master controller according to a specified time interval. The master controller 12 may determine or receive input for the refueling truck operating condition for stored data. A time interval for transmitting data to the master controller 12 may be user controlled and/or automated (e.g., preset). The data logger controller 40 may fetch/transmit the data when there is reliable cellular connection (e.g., to avoid data loss). The system may be configured for various types of data capturing (e.g., as specified by a user, by airport authorities, etc.). Examples of data to be captured include quantity of fuel, quality of fuel, and time required for fueling the aircraft, among others.

In embodiments, a data analysis mode may be an independent mode of operation. Once fetched/received, data may be available on/at the master controller 12. The master controller 12 may conduct or receive analysis and use the analysis to determine whether the aircraft refueling system 10 and/or the FCS is operating as expected. The data analysis may be done using smart scripts. The data can be analyzed (e.g., continuously), such as via an offline batch-type process triggered at a certain time and/or upon certain requests/conditions. The master controller 12 may create a backup of received raw field data from platform controllers/refueling trucks. The output of analysis may include a confirmation that the aircraft refueling system and/or the fuel control system is operating as desired or expected. The data analysis statistics may be used to improve system efficiency. A smart script may compensate for potential issues and/or may automate communications with a user (e.g., a service engineer, a system engineer, airport authorities), such as via auto generated message or email.

With embodiments, a user may determine what data should be monitored. For example and without limitation, a user may decide to monitor specific data that may be helpful for predictive and/or preventive maintenance for refueling components.

In embodiments, in a programming mode, the master controller may control one or more FCS that may already be in the field, such as via a unique node identification of the FCS. Controlling a respective FCS may include upgrading and/or modifying the software of the system automatically and/or remotely.

With embodiments, the aircraft refueling system 10 may include interlocks and/or other access control features to control access to the programming mode. A programming mode may be run in a highly controlled manner (e.g., safety protocols, password requirements, etc.). Access to the programming mode may be limited to certain users with appropriate qualifications (e.g., appropriate experience with programming refueling controllers).

With embodiments, in a smart mode, if a hazardous condition is diagnosed/detected (e.g., via the master controller 12), the aircraft refueling system 10 may immediately generate and send an email or other notification to a respective airport authority department (or other remote location). The email or other notification may, for example, include details of the platform/truck and the observed hazardous situation, which may be utilized by the airport authority to take appropriate action.

In embodiments, in a smart mode, the aircraft refueling system 10 may provide prognostic functionality, such as generating and sending an advance email to a respective airport authority department along with details of the platform and the observed prognostic condition so that the airport authority may take action quickly to avoid down time of a platform (e.g., a refueling truck). Additional functionality (e.g., user friendly intelligence) may be provided in the smart mode and may be shared with airport authorities.

In embodiments, the aircraft refueling system 10 may include one or more other modes.

With embodiments, remote programming of controllers and data logging may be implemented by region. For example and without limitation, controllers/servers can be installed at airports or regional locations and may be connected to the master controller 12 to collect the data. Disposing controllers at regional locations may facilitate resolution of field issues in a timely and efficient manner (e.g., automatically and/or remotely).

Embodiments of aircraft refueling systems 10 according to teachings of the present disclosure may be configured to provide one or more advantages relative to other systems. For example and without limitation, embodiments of aircraft refueling systems may, inter alia:

(1) avoid or reduce unnecessary delays in service;
(2) include remote programming functionality for fuel control systems and/or controllers;
(3) provide rapid responses to service requests;
(4) provide data that may be well organized to fine tune existing software for better efficiency;
(5) not require personal physical presence for in-field debugging of system errors;
(6) not involve additional accessories, such as ECOM cables (e.g., cables that may be utilized for connecting a computer to a CAN bus);
(7) provide independently collected data from the field;
(8) reduce platform (e.g., fuel truck/cart) down time;
(9) monitor a fuel control system, suggest preventative maintenance, and/or perform maintenance; and/or
(10) reduce spare parts.

In embodiments, a controller (e.g., the master controller 12, the fleet controller(s) 14, the platform controller 18, the PPCM controller 20, the SPCM controller 22, the PLC 24, and/or the data logger controller 40) may include an electronic controller, a computer, and/or include an electronic processor, such as a programmable microprocessor and/or microcontroller. In embodiments, a controller may include, for example, an application specific integrated circuit (ASIC). A controller may include a central processing unit (CPU), a memory, and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Embodiments of the present disclosure may be configured to operate in connection with Internet of Things (IoT) systems and/or features. Embodiments may be used in connection a variety of applications, such as applications that include smart components (e.g., aerospace, hydraulics, electrical, vehicles, trucks, etc.). IoT systems may be relatively complex as execution may involve use of different sets of technology layers, such as cloud computing or services, various application specific communication protocols, different connectivity or networking options, and/or embedded systems software/firmware developments, among others.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

It should be understood that a controller, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM and RAM and/or a combination of non-volatile and volatile (modifiable) memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An aircraft refueling system, comprising:
   a master controller;
   a fleet controller in communication with the master controller;
   a platform controller in communication with the fleet controller and associated with a platform, wherein the platform comprises a mobile or stationary fuel source separate from an aircraft; and
   a fuel control system in communication with the platform controller and installed on the platform, the fuel control system including a primary pressure controller, a secondary pressure controller, a programmable logic controller, and a data logger controller;
   wherein the master controller is configured to receive and analyze data from at least one of the fleet controller, the platform controller, and the fuel control system, wherein the data includes diagnostic data concerning the fuel control system; and based at least in part on the analysis of the received data, the master controller is configured to modify operational parameters or upgrade the fuel control system.

2. The aircraft refueling system of claim 1, wherein at least one of the primary pressure controller and the secondary pressure controller are configured to control a fuel control valve that is configured to provide fuel to the aircraft.

3. The aircraft refueling system of claim 2, wherein the at least one of the primary pressure controller and the secondary pressure controller are configured to control the fuel control valve according to a fluid pressure at or associated with a nozzle via which the fuel control valve provides the fuel to the aircraft.

4. The aircraft refueling system of claim 3, further comprising at least one sensor connected at or associated with the nozzle.

5. The aircraft refueling system of claim 4, wherein the at least one sensor is at least one of a flow meter, a pressure sensor, a temperature sensor, a water presence sensor, a contamination sensor, a timer, and a clock.

6. The aircraft refueling system of claim 1, further comprising a display unit in communication with at least one of the primary pressure controller, the secondary pressure controller, the programmable logic controller, and the data logger controller.

7. The aircraft refueling system of claim 1, wherein the primary pressure controller, the secondary pressure controller, the programmable logic controller, and the data logger controller are in communication with at least one of each other via a controller area network (CAN) bus protocol.

8. The aircraft refueling system of claim 1, wherein the data logger controller is in communication with the master controller over a communication network.

9. The aircraft refueling system of claim 1, wherein at least one of the primary pressure controller, the secondary pressure controller, the programmable logic controller, and the data logger controller includes a unique node identifier by which at least one of the fuel control system and a respective component are accessible by the master controller.

10. A method for operating an aircraft refueling system, comprising:

controlling, via at least one of a primary pressure controller and a secondary pressure controller of a fuel control system fuel flow from a refueling platform to an aircraft, the fuel control system in communication with a platform controller and installed on the refueling platform, wherein the refueling platform comprises a mobile or stationary fuel source separate from the aircraft;

logging, via a data logger controller of the fuel control system, data related to the fuel flow to the aircraft and including diagnostic data concerning the fuel control system;

monitoring, via at least one of a master controller of the aircraft refueling system, a fleet controller of the aircraft refueling system, the primary pressure controller, the secondary pressure controller, the platform controller, the data logger controller, and a programmable logic controller of the fuel control system, the data to identify any trends in changes in operational performance, wherein the fleet controller of the aircraft refueling system is in communication with the fuel control system; and based at least in part on an identified trend, modifying operational parameters or upgrading the fuel control system.

11. The method of claim 10, further comprising logging, via the platform controller, data, including at least one of maintenance schedules and fault details identified for components of the refueling platform, and communicating the data to the master controller.

12. The method of claim 11, further comprising tagging, via the platform controller, at least a subset of the data for further analysis.

13. The method of claim 10, further comprising storing, via at least the master controller, at least a subset of data received from at least one of the fuel control system, the platform controller, and the fleet controller.

14. The method of claim 10, further comprising analyzing, via at least the master controller, at least a subset of data received from one refueling location to predict refueling performance at another refueling location.

15. The method of claim 10, further comprising accessing, via the master controller, at least one of the fuel control system and a component thereof based on a unique node identifier of at least one of the primary pressure controller, the secondary pressure controller, the programmable logic controller, and the data logger controller.

16. The method of claim 10, further comprising deploying, via the master controller over a communications network, software updates to at least one of the fleet controller, the platform controller, and the fuel control system.

17. The method of claim 10, further comprising at least one of performing and receiving field data analysis.

18. The method of claim 10, wherein, in a data capturing mode, the data logger controller transmits logged data to the mater controller according to a specified time interval.

19. The method of claim 18, wherein, in a data analysis mode, the master controller analyzes received data to determine if the fuel control system is operating properly.

20. The method of claim 10, wherein, in a programming mode, the master controller controls at least one fuel control system, including at least one of upgrading and modifying software of the fuel control system.

* * * * *